United States Patent [19]

Wolf et al.

[11] Patent Number: 5,623,899
[45] Date of Patent: Apr. 29, 1997

[54] VALVE TIMING GEAR FOR AN INTERNAL COMBUSTION ENGINE

[75] Inventors: Harry Wolf, Uhingen; Albert Rapp, Ludwigsburg, both of Germany

[73] Assignee: Mercedes-Benz AG, Stuttgart, Germany

[21] Appl. No.: 575,706

[22] Filed: Dec. 19, 1995

[30] Foreign Application Priority Data

Dec. 23, 1994 [DE] Germany ................. 44 46 488.6

[51] Int. Cl.$^6$ ................................................. F01M 9/08
[52] U.S. Cl. ............................................... 123/90.36
[58] Field of Search .................... 123/196 R, 196 M, 123/196 V, 90.33, 90.36

[56] References Cited

U.S. PATENT DOCUMENTS 5,125,373  6/1992  Yamada et al. ................. 123/90.36

FOREIGN PATENT DOCUMENTS

| 812862 | 7/1949 | Germany . |
| 3009062 | 10/1981 | Germany . |
| 3330141 | 3/1985 | Germany . |
| 3515850 | 11/1985 | Germany . |
| 4310735 | 5/1994 | Germany . |

Primary Examiner—Erick R. Solis
Attorney, Agent, or Firm—Klaus J. Bach

[57] ABSTRACT

In a valve timing gear for an internal combustion engine having valves, means for actuating the valves and oil supply passages for supplying lubricating oil to the valve actuating means, the oil supply passages have side bores with outlet openings arranged above the valve stem surface areas to be lubricated and a pin-like restrictor with at least one longitudinal groove is disposed in each bore for controlling the oil flow through the bore and guiding it along the pin-like restrictor which ends above surface area to be lubricated.

7 Claims, 1 Drawing Sheet

15,623,899

VALVE TIMING GEAR FOR AN INTERNAL COMBUSTION ENGINE

BACKGROUND OF THE INVENTION

The invention relates to a valve timing gear for an internal combustion engine and, more particularly, to a lubrication arrangement therefor.

The valve timing gear of internal combustion engines must be supplied with lubricant, generally, oil. This is particularly true for the contact area between the valve bridge piece and the valve stem end. However, access to this region is sometimes difficult. This is particularly true of multivalve cylinder heads and, in that context, especially of a V-type engine, wherein the valves are arranged in a 45° inclined position.

DE 33 30 141 C2 describes a valve timing gear for an internal combustion engine, wherein a lubricant passage with a calibration means or restractor is provided in the camshaft. The purpose of this lubricant passage is to provide lubricant to a rocker arm for actuating a valve. However, the lubricant passage can lead to weakening and wear of the camshaft, so that this way of lubricating the valve rocker arm is not suitable in practice.

German Offlegungsschrift 3,515,850 discloses a valve-actuating arrangement for an internal combustion engine with an overhead camshaft or camshafts. In this arrangement, an acnuating device, designed as a pivot arm, actuates a pair of exhaust valves in each of the cylinders of the internal combustion engine. All the valve actuating elements are lubricated by way of a main oil supply passage which running through a tubular pivot arm support shaft which has passages extending to the parts which move relative to one another, and outflow openings which are aligned with these parts. this arrangement, appropriate side passages with outflow openings are also provided in the actuating devices.

The disadvantage of the valve actuating arrangement disclosed in DOS 3,515,850, however, is that it is very complex and the side passages are located in moving components, making it difficult to control the flow of the lubricant properly.

It is the object of the present invention to provide a valve timing gear with which it is possible to achieve selective lubrication, particularly in the form of drip feed oiling in a simple manner, even for valves to which access is difficult.

SUMMARY OF THE INVENTION

In a valve timing gear for an internal combustion engine having valves, means for actuating the valves and oil supply passages for supplying lubricating oil no the valve actuating means, the oil supply passages have side bores with outlet openings arranged above the valve stem surface areas to be lubricated and a pin-like restrictor with at least one longitudinal groove disposed in each bore for controlling the oil flow through the bore and guiding it along the pin-like restrictor which ends above the surface area to be lubricated.

The restrictor is in the form of a pin with one or more slots arranged on its periphery and is inserted into the side bore. This simple means permits selective lubrication even of points of the valve timing gear to which access difficult.

By inserting a pin in the form as described above into the side bores, particularly a cylindrical pin provided with axial grooves, problem-free dripfeed oiling of the valves with any desired oil flow is possible.

In a preferred embodiment of the invention, the side passages are arranged in a stationary actuating device, such as a rocker arm support bracket, allowing very precise feeding of the lubricant to the desired point in the valve timing gear.

Further advantageous arrangements and embodiments of the invention will be apparent from the following description of a preferred embodiment of the invention.

DESCRIPTION OF A PREFERRED EMBODIMENT

Since the valve timing gear and the valve itself are well known, only those parts which are essential for an understanding the invention are described in detail below.

Figure 1:
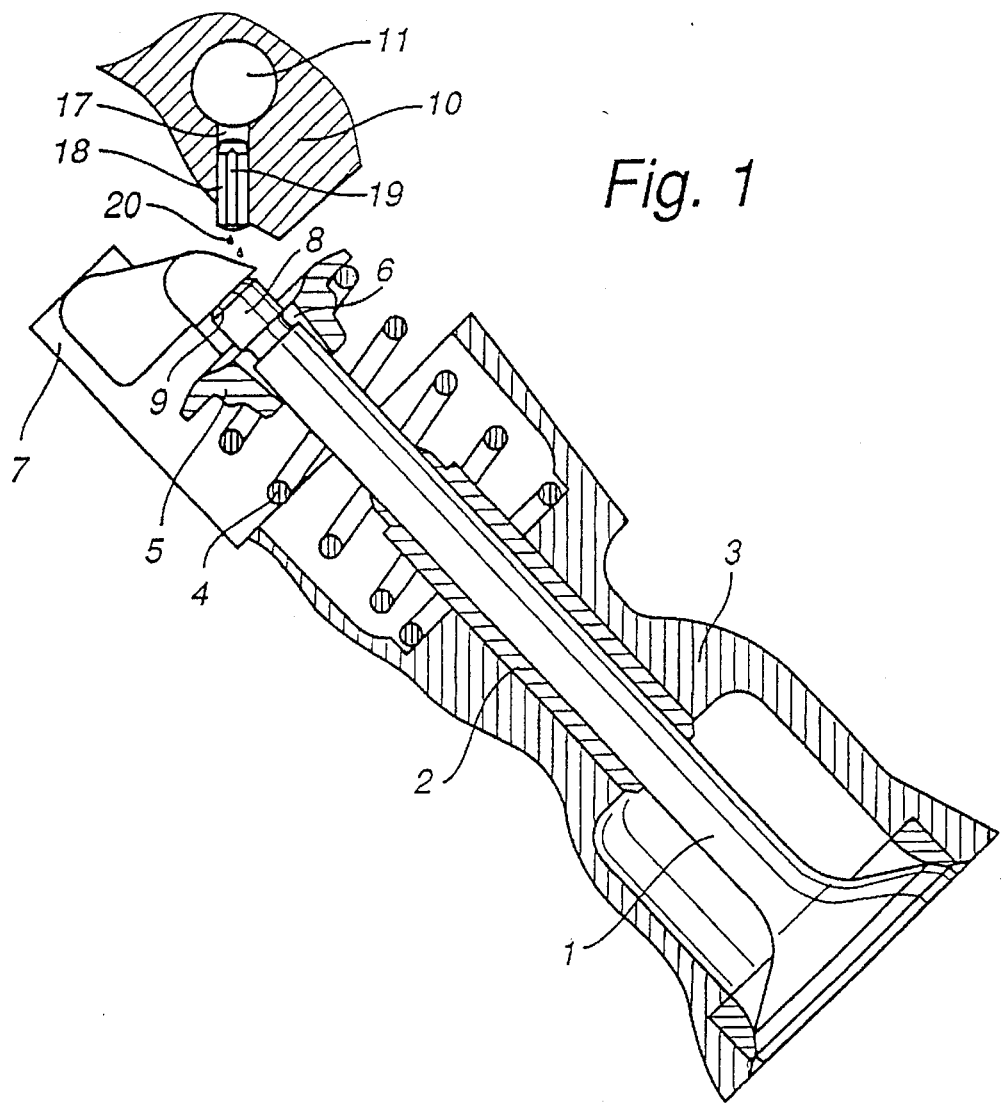
FIG. 1 is a partial side view of a valve with a rocker arm support bracket shown in section 2.

As shown in FIG. 1 a valve 1 is mounted in a cylinder head 3 by means of a valve guide 2. The valve 1 furthermore has a valve spring 4 with a valve spring retaining washer 5 and valve spring keys 6.

For every two valves, a valve bridge 7 is provided which actuates the valve 1 by means of the valve stem 8 of he valve 1 by way of a contact surface 9. In accordance with FIG. 1, the contact surface 9 is located between the underside of the valve bridge 7 and the top end of the valve stem 8. An actuating arrangement in the form of a rocker arm bracket 10, which is illustrated in part in FIG. 1 and is shown in section in FIG. 2, serves to support rocker arms (not shown) which, in order to operate the valves 1, actuate the valve bridge 7 in an appropriate manner. The rocker arm bracket 10 is firmly mounted on a part of the cylinder head 3 and has an oil passage 11 extending through its interior.

Figure 2:
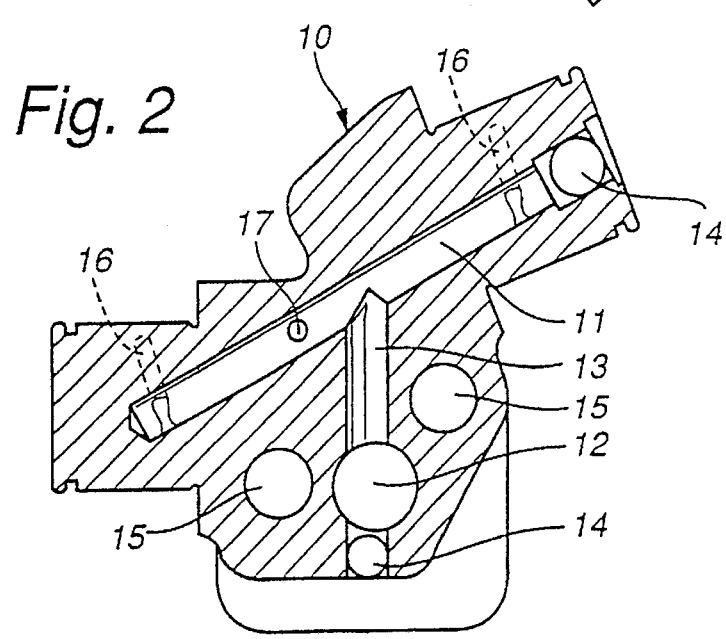
FIG. 2 shows a section through a rocker arm support bracket.

The rocker arm bracket 10 is illustrated in greater detail in section in FIG. 2. Oil under pressure is admitted to the oil passage 11 via an oil inlet 12 and a pressurized oil passage 13. The pressurized oil passage 13 and the oil passage 11 are each closed off in a simple manner from the outside by a press-fitted ball 14. To fasten the rocker arm bracket 10 on the cylinder head 3, bores 15 for receiving fastening bolts are provided. Branching off from the oil passage 11, branch passages 16 lead to the bearings of the rocker arms (not shown). Branching off from the oil passage 11, there is, in addition, a side bore 17, via which metered dripfeed oiling of the valve timing gear or, that is more precisely, of the contact surface 9 and the surrounding area of the valve stem 8 and of the valve spring retaining washer 5 is possible.

From the enlarged illustration of FIG. 1, it can be seen that a grooved cylindrical pin 18 is inserted into the side bore 17. The grooved cylindrical pin 18 has, for example, three narrow grooves 19 arranged equally spaced on the periphery of the pin 18.

The side bore 17 is arranged in the rocker arm bracket in such a way that its outlet opening ends above the valve stem 8, adjacent the end of the latter.

The grooves 19 restrict the oil flow and ensure selective dripfeed oiling (indicated by droplets 20) for the valve timing gear, in particular for the contact surface 9.

As can furthermore be seen from FIG. 1, the grooved cylindrical pin 18 projects beyond the outlet opening of the side bore 17. This creates a well defined separation edge for the oil droplets forming from the oil flowing through the longitudinal slots 19, providing accurate oil lubrication of the contact surface 9.

The grooved cylindrical pin 18 is simply hammered or pressed into the side bore 17, thus reliably closing the side bore 17 with a press fit. Further fastening or securing measures for the grooved cylindrical pin 18 are thus not necessary.

In practice, the side bore 17 creates a predetermined oil leakage for the oil passage 11 of the rocker arm bracket 10. However, this oil leakage is fully sufficient for lubricating the valve timing gear.

What is claimed is:

1. A valve timing gear for an internal combustion engine having valves with valve stems having surface areas to be lubricated, means for actuating said valves and oil supply passages for supplying lubricating oil to said valve actuating means, said oil supply passages having side bores each with an outlet opening arranged above a surface area of a valve stem which is to be lubricated and a restrictor mounted in said outlet opening for controlling the oil flow therethrough, said restrictor being a pin having at least one axially extending groove formed in its outer surface and being received in said side bore so as to define, with the bore wall, an oil flow restriction passage.

2. A valve timing gear according to claim 1, wherein said pin is a grooved cylindrical pin.

3. A valve timing gear according to claim 1, wherein said pin has at least three grooves arranged equally spaced over its periphery.

4. A valve timing gear according to claim 1, wherein said pin protrudes at least partially from said side bore.

5. A valve timing gear according to claim 1, wherein said pin is inserted into the side bore with a press fit.

6. A valve timing gear according to claim 1, wherein said side bore is arranged in a stationary part of said actuating means.

7. A valve timing gear according to claim 6, wherein said stationary means is a rocker arm bracket.

* * * * *